United States Patent
Doleh et al.

(10) Patent No.: US 9,667,415 B1
(45) Date of Patent: May 30, 2017

(54) DOMAIN-SERVER PUBLIC-KEY REFERENCE

(71) Applicant: International Business Machines Corporation, Armonk, NY (US)

(72) Inventors: Yaser K. Doleh, North Royalton, OH (US); Mauro Marzorati, Lutz, FL (US); John C. Wingenbach, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/084,580

(22) Filed: Mar. 30, 2016

Related U.S. Application Data

(63) Continuation of application No. 14/944,250, filed on Nov. 18, 2015.

(51) Int. Cl.
  *H04L 29/06* (2006.01)
  *H04L 9/08* (2006.01)
  *H04L 9/32* (2006.01)

(52) U.S. Cl.
  CPC ............ *H04L 9/0819* (2013.01); *H04L 9/083* (2013.01); *H04L 9/0894* (2013.01); *H04L 9/321* (2013.01); *H04L 9/3236* (2013.01); *H04L 9/3242* (2013.01); *H04L 63/062* (2013.01); *H04L 63/0876* (2013.01)

(58) Field of Classification Search
  CPC ....... H04L 9/0819; H04L 9/083; H04L 9/321; H04L 9/3236; H04L 63/062
  See application file for complete search history.

(56) References Cited

U.S. PATENT DOCUMENTS

| | | | |
|---|---|---|---|
| 6,928,167 B1 | 8/2005 | Maeda et al. | |
| 6,978,025 B1 * | 12/2005 | Price, III | H04L 63/06 380/277 |
| 7,305,556 B2 * | 12/2007 | Slick | G06F 21/608 713/168 |
| 7,664,947 B2 | 2/2010 | Fang | |
| 8,135,645 B2 | 3/2012 | Kay et al. | |
| 8,494,168 B1 | 7/2013 | Tolfmans | |
| 8,538,028 B2 | 9/2013 | Yeap et al. | |
| 8,646,049 B2 | 2/2014 | Goeller et al. | |
| 9,083,696 B1 * | 7/2015 | Khaitan | H04L 63/0823 |
| 9,544,278 B2 * | 1/2017 | Hozza | H04L 63/0442 |
| 2005/0039017 A1 * | 2/2005 | Delany | H04L 9/30 713/176 |

(Continued)

OTHER PUBLICATIONS

Rafiee, Hosnieh; Meinel, Christoph; "A Secure, Flexible Framework for DNS Authentication in IPv6 Autoconfiguration", $12^{th}$ IEEE International Symposium on Network Computing and Applications (NCA), IEEE, Aug. 22-24, 2013, pp. 165-172.*

Rafiee, Hosnieh; von Lowis, Martin; Meinel, Christoph; "DNS Update Extension to IPv6 Secure Addressing", $27^{th}$ International Conference on Advanced Information Networking and Applications Workshops (WAINA), IEEE, Mar. 25-28, 2013, pp. 896-902.*

(Continued)

*Primary Examiner* — Victor Lesniewski
(74) *Attorney, Agent, or Firm* — Nolan M. Lawrence

(57) ABSTRACT

A domain is identified from a communication address. The domain corresponds to a host name. Resource records associated with the host name are caused to be queried for a public key reference. The public key reference is received in response to the caused resource record query. A public key associated with the communication address is identified based on the public key reference.

1 Claim, 3 Drawing Sheets

(56) References Cited

U.S. PATENT DOCUMENTS

| | | | |
|---|---|---|---|
| 2006/0031319 A1 | 2/2006 | Nelson et al. | |
| 2006/0165060 A1 | 7/2006 | Dua | |
| 2009/0144380 A1* | 6/2009 | Kallman | G06Q 10/107 709/206 |
| 2009/0198997 A1* | 8/2009 | Yeap | H04L 63/0823 713/155 |
| 2010/0318614 A1 | 12/2010 | Sager et al. | |
| 2012/0110341 A1* | 5/2012 | Beigi | G06Q 20/3223 713/186 |
| 2012/0150975 A1* | 6/2012 | Kallman | G06Q 10/10 709/206 |
| 2012/0170749 A1* | 7/2012 | Rich | H04L 9/0894 380/277 |
| 2012/0204032 A1* | 8/2012 | Wilkins | H04L 9/006 713/170 |
| 2012/0304261 A1* | 11/2012 | Justice | G06Q 10/107 726/5 |
| 2013/0282920 A1* | 10/2013 | Zhang | H04L 45/74 709/238 |
| 2013/0283041 A1 | 10/2013 | Vajirkar et al. | |
| 2014/0244998 A1 | 8/2014 | Amenedo et al. | |
| 2015/0381558 A1* | 12/2015 | Tuliani | H04L 63/12 713/168 |
| 2016/0072782 A1* | 3/2016 | Justice | H04L 63/08 726/7 |
| 2016/0197898 A1* | 7/2016 | Hozza | H04L 63/0442 713/168 |
| 2016/0248746 A1 | 8/2016 | James et al. | |
| 2016/0330174 A1* | 11/2016 | Sullivan | H04L 63/0281 |
| 2016/0330185 A1* | 11/2016 | Morsing | H04L 63/08 |
| 2017/0006023 A1* | 1/2017 | Behnken | H04L 63/0853 |

OTHER PUBLICATIONS

Wang, Yong; Yun, Xiaochun; Yao, Yao; Xiong, Gang; Li, Zhen; "Traffic Measurement Based DNSSEC Analysis", 12$^{th}$ International Conference on Computer and Information Technology (CIT), IEEE, Oct. 27-29, 2012, pp. 62-69.*

Wernersson, R., "How should I distribute my public key?", Information Security, Nov. 17, 2010, last modified Jun. 29, 2011, 4 pages, © 2015 Stack Exchange Inc.

Galvin et al., "Security Multiparts for MIME: Multipart/Signed and Multipart/Encrypted," Network Working Group, Request for Comments: 1847, Oct. 1995, 12 pages, last printed on Aug. 18, 2015.

Atkins et al., "PGP Message Exchange Formats," Network Working Group, Request for Comments: 1991, Aug. 1996, 20 pages, last printed on Aug. 18, 2015.

Callas et al., "OpenPGP Message Format," Network Working Group, Request for Comments: 2440, Nov. 1998, 59 pages, last printed on Aug. 18, 2015.

Eastlake, D., "Domain Name System Security Extensions," Network Working Group, Request for Comments: 2535, Updates: 2181, 1035, 1034, Mar. 1999, 48 pages, last printed on Aug. 18, 2015.

Eastlake et al., "Storing Certificates in the Domain Name System (DNS)," Network Working Group, Request for Comments: 2538, Mar. 1999, 11 pages, last printed Aug. 18, 2015.

Evans et al., "Public Key Pinning Extension for HTTP," Internet Engineering Task Force (IETF), Request for Comments: 7469, Apr. 2015, 29 pages, ISSN: 2070-1721, last printed on Aug. 19, 2015.

Cheshire et al., "Special-Use Domain Names," Internet Engineering Task Force (IETF), Request for Comments: 6761, Updates: 1918, 2606, Feb. 2013, 13 pages, ISSN: 2070-1721.

Doleh et al., "Domain-Server Public-Key Reference", U.S. Appl. No. 14/944,250, filed Nov. 18, 2015.

IBM, List of IBM Patents or Patent Applications Treated as Related, Jul. 20, 2016, 2 pages.

* cited by examiner

DOMAIN-SERVER PUBLIC-KEY REFERENCE

BACKGROUND

The present disclosure relates to secure communications, and more specifically, to using domain resource records for storing public key references.

Secure communications allow users to share information together without third parties reading the communications. Secure communications may enable users to communicate without a third party's knowledge of their communications. Secure communications may be used in business to protect intellectual property. Secure communications may be used by individuals to provide confidence that the information they are sharing remains private.

SUMMARY

According to embodiments of the present disclosure, aspects of the disclosure may include a method, a system, and a computer program product. A domain is identified from a communication address. The domain corresponds to a host name. Resource records associated with the host name are caused to be queried for a public key reference. The public key reference is received in response to the caused resource record query. A public key associated with the communication address is identified based on the public key reference.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
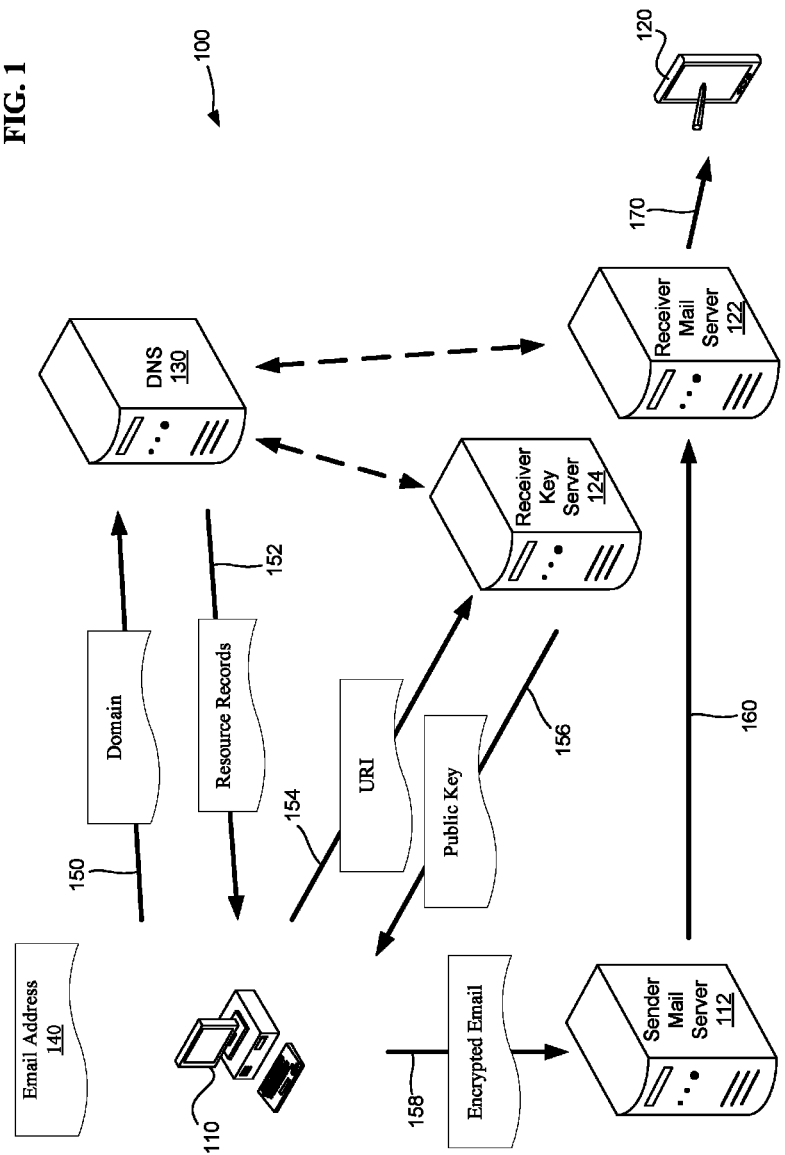
FIG. 1 depicts an example computing environment used to locate and authenticate a public key consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to secure communications, more particular aspects relate to using domain resource records for storing public key references. While the present disclosure is not necessarily limited to such applications, various aspects of the disclosure may be appreciated through a discussion of various examples using this context.

Public key encryption provides a useful means for facilitating secure communications. A potential sender (sender) may utilize public key encryption to send secure messages to a potential recipient (recipient). Public key encryption relies upon a public key, a message encrypted with the public key, and a private key utilized to unencrypt the encrypted message. Provided a recipient does two things, public key encryption may remain a viable method of secure communication (e.g., a method that ensures message confidentiality, message integrity, and message authenticity). First, the recipient must keep the private key secure (e.g., only the recipient has access to the private key). Second, the recipient must reliably communicate the public key to any and all potential senders.

Public key servers may provide a centralized repository for public keys. A public key server may act as a third party for facilitating secure communication. For example, a public key server may receive requests from one or more potential communication recipients. In response to these requests the public key server may store and publish the public keys at a universal resource indicator (URI) within a network accessible by potential senders (e.g., a universal resource location corresponding to a public key on the Internet). In many cases a third party may also generate both the public and private keys and may provide additional security measures (e.g., providing a digital certificate with an additional secure key for verification of a public key).

One complication is that often multiple public key servers exist. Multiple public key servers may introduce inconsistency that prevents a user from reliably determining the location of the public key (e.g., a first public key server may have one public key and a second public key server may have a second public key and both public keys may be for the same recipient). Public key servers may also not be ideal in situations where the control of public keys is required by a specific user or organization, such as for policy or security reasons.

A privately controlled key server (user key server) may enable a potential recipient of a secure communication to control availability of a public key (e.g., the recipient or an agent of the recipient may operate the user key server). User key servers, however, may not provide the ability to verify that the public key itself is genuine (e.g., a user key server is a single location controlled by a single actor). If a user key server is compromised, then a potential sender may not obtain the right public key for a potential recipient (e.g., a third party may alter the public key to try eavesdropping on the secure communication).

In some embodiments, a domain name system based public key reference (DPR) may enable widespread, standardized communication and simple verification of public keys. A DPR may enable users to send secure messages (e.g., encrypted chat or email) with confidence that the public keys are genuine. A domain name system (DNS) may provide one or more network servers that help translate domains into server addresses to facilitate network communication. A DPR may utilize one or more resource records of the DNS to store a reference to the public key (e.g., a hostname or URI to a location accessible on the Internet). A DPR may also be useful for user key servers because of the ubiquity of DNS (which is utilized by a vast majority of websites and email found on the Internet).

The DPR may also store a copy of the public key for verification. In some embodiments, the copy may be a digest (e.g., a hash) of the public key. The digest may be of a shorter character length than the public key itself, which may be a preferred format for storage in a resource record of a DNS server (e.g., SHA 256-bit, MD5, etc.). A potential sender may verify the integrity of the public key referred to by the DPR with the copy. For example, a potential attacker of the public key would have to alter both the copy stored on a DNS server (controlled by a first party) and an actual public key at a location of a potential recipient's choosing (stored on a server controlled by a second user) in order to mislead a sender that relies on the DPR.

FIG. 1 depicts an example computing environment 100 used to locate and authenticate a public key consistent with embodiments of the present disclosure. The computing environment 100 may be utilized by the potential receivers of email to advertise public keys that may be used by potential senders for encrypting email. The computing environment 100 may include the following: a first client 110 utilized by a potential sender (sender) of a secure email; a mail server of the sender (sender server) 112; a second client 120 utilized by a potential recipient (recipient) of secure email; a mail server of the recipient (recipient server) 122; a private key server controlled by the recipient (user key server) 124; and one or more DNS servers 130.

The first client 110 may be a first mail user agent (MUA) running on a physical device (e.g., an email client running on a desktop computer, laptop computer, or smart phone). The sender server 112 may be a mail transfer agent (MTA) (e.g., a communication transfer agent) running on one or more servers. The second client 120 may be a second MUA running on another physical device. The recipient server 122 may be a mail delivery agent (MDA) running on one or more servers. In some embodiments, an MTA and an MDA may be located in separate geographic locations and operated by two distinct mail providers (e.g., a first mail provider in Redmond, Wash. and a second mail provider in Mountain View, Calif.). In some embodiments, an MTA and an MDA may be located in the same geographic location and operated by a single mail provider (e.g., two pieces of software running on the same server in a datacenter in Maiden, N.C.). The user key server 124 may be a network accessible URI containing a public key hosted on one or more network servers (e.g., Internet servers).

The recipient may generate the public key along with a private key to enable public key encryption. In some embodiments, the recipient may obtain the public key from a third party, such as a key generation service. The recipient may also provide his email address 140 to the sender. The email address 140 may contain a local part and a domain part. For example, if the recipient has an email address 140 of user1@example.com, then the local part is user1 and the domain part is example.com. In some embodiments, the recipient may provide the email address 140 directly to the sender (e.g., by sending a prior email to the sender, by providing the sender with a business card that has the email address printed thereon). In some embodiments, the recipient may provide the email address 140 indirectly to the sender, such as by providing a website with contact information on it that includes the email address. For example, the sender may read an article written by the recipient also on the website and may notice the contact information while reading the article.

The sender may decide to email the recipient and may utilize the first client 110. The sender may begin by entering in the email address 140 of the recipient into the first client 110 and composing some text into a header and a body of the email. The first client 110 may identify from the email address 140 a domain. The domain may be a domain part, such as the domain part example.com of the email address user1 @example.com. The domain part may also be an IP address, such as the IP address of a server 192.168.1.1 for the email address user1@ [192.181.1.1]. The domain may be the local part, such as the local part user1 of the email address user1 @example.com. In some embodiments, the domain part may be useful to determine the URI of a network resource. For example, an email address user1 @example.com corresponds to a host name example. In some embodiments, the domain may not have a local part and a domain part, such as with a chat service using a messaging protocol, and the domain may be all that is necessary to determine the host name.

The first client 110 may cause the DNS servers 130 to query resource records related to the domain at 150. The DNS servers 130 may query for domain records that may relate to the domain of the email address 140 (e.g., example.com). The resource records may be contained in one or more of the preexisting record formats for DNS resource records (e.g., TXT records). The resource records may be compliant with existing computer readable formats for TXT records (e.g., sender policy framework, etc.). In some embodiments, the DNS servers 130 may query for domain records that may relate to one or more subdomains of the domain (e.g., us.example.com, contact.example.com, communication.example.com).

The resource records may be contained in a subdomain agreed upon by email and website operators for the storage of public key references. Utilizing a singular subdomain agreed upon for public key references may be advantageous (e.g., larger entities with hundreds or thousands of users each with their own email addresses would correspond to hundreds or thousands of public keys). An example of email addresses and corresponding agreed upon subdomains is provided in the following Table 1:

TABLE 1

| User1@example.com | user1.AT.example.com |
| User2@example.com | user2.AT.example.com |
| Bob.Smith@example.com | bob.smith.AT.example.com |
| JWMMYD@us.example2.com | jwmmyd.AT.us.example2.com |
| admin@contact.example2.com | admin.AT.contact.example2.com |

Using the above Table 1, hosts would agree upon using the subdomain name AT. For example, a DNS entry for example.com would have a subdomain with resource records at AT.example.com for email addresses User1@example.com, User2@example.com, and Bob.Smith@example.com. The resource records at AT.example.com would further point to additional subdomains with resource records containing public key references at user1.AT.example.com, user2.AT.example.com, and bob.smith.AT.example.com, respectively. Further, a DNS entry for example2.com would have subdomains with resource records at us.example2.com and contact.example2.com. Subdomain DNS entry us.example2.com would have a subdomain with a resource record at AT.us.example2.com for email address jwmmyd.AT.us.example2.com. The resource records at AT.us.example2.com would further point to an additional subdomain with resource records containing a public key reference at jwmmyd.AT.us.example2.com. Subdomain DNS entry contact.example2.com would have a subdomain with a resource record at AT.contact.example2.com for email address admin@contact.example2.com. The resource records at AT.contact.example2.com would further point to an additional subdomain with resource records containing a public key reference at admin.AT.contact.example2.com.

The DNS server 130 may respond to the first client 110 by transmitting one or more found resource records at 152. The resource records may relate to the email address 140. For example, a client may receive (in response to the caused DNS query at 150) a resource record including the following information for domain example.com and for email address user1 @example.com:

user1 IN TXT "v=DPR url=https://keys.example.com/user1_pub.txt"

The user1 resource record may instruct the first client 110 to seek the public key stored at https://keys.example.com/user1_pub.txt to encrypt communication intended for user1 @example.com. In some embodiments, the client may receive (in response to a DNS query) a resource record at 152 including information related to the subdomains corresponding to the resource records. The following is an example resource record for pointing users to an email subdomain for example.com:

@ IN TXT "v=DPR domain=AT.example.com keyserver=https://keys.example.com"

Upon receiving the @ resource record, the first client 110 may initiate a second query by the DNS server 130 related to the domain AT.example.com. In response to the initiated second query the DNS server 130 may query the domain AT.example.com and send the results of the second query to the first client 110. An example of a set of relevant resource records for an example subdomain of AT.example.com is provided in the following Table 2:

TABLE 2

| Record 1 | @ | IN | TXT | "v = DPR keyserver = https://keys.example.com/" |
|---|---|---|---|---|
| Record 2 | user1 | IN | TXT | "v = DPR url = https://pks.example.com/user1_pub.txt" |
| Record 3 | user2 | IN | TXT | "v = DPR uri = user2_pub.txt sha256 = 6aec6e61ac8cd59cd8b81455edfd55b1b23910bf171b314eb74baae8b3a63e92" |
| Record 4 | manager | IN | TXT | user2 |
| Record 5 | user3 | IN | CNAME | "v = DPR uri = user3_pub_v2.txt md5:859260f9bf8ffa47becaed66ddcdb603 discard = md5:6f49df093f19d5d48358cd94ea82f073" |

Using the resource record examples from Table 2, the first resource record may indicate that public keys retrievable from the server accessible at https://keys.example.com/. The second resource record may indicate that the email address user1 @example.com corresponds with a public key in a text document located at https://pks.example.com/user1_pub.txt. The third and fourth resource records may indicate that the email address manager@example.com corresponds to a public key located at https://keys.example.com/user2_pub.txt (e.g., the fourth resource record is an alias to the third resource record). The third resource record may include a digest (e.g., hash) of the public key for the email address manager@example.com. The digest may be in a known hash format (e.g., md5, sha128, sha512, etc.). The fifth resource record may indicate that the email address user3@example.com corresponds to a public key located at https://keys.example.com/user2_pub_v2.txt. The fifth resource record may also include a digest of the public key for the email address user3@example.com. The fifth resource record may also include a negative assertion to communicate that a previously used digest is now invalid.

After receiving resource records at 152 indicative of a public key reference, the first client 110 may identify (e.g., determine, compare) from the resource records a URI corresponding to user key server 124 hosting the public key. The first client 110 may request from the user key server 124 the public key at 154. In response to the request at 154, the user key server 124 may provide the first client 110 with the public key at 156. The MUA of the first client 110 may utilize the public key received from the user key server 124 to encrypt the email.

In some embodiments, the resource records received at 152 may also include a digest of the public key. After receiving the public key from the user key server 124 the first client 110 may generate (e.g., via a hashing algorithm) a hash sum from the public key received from the user key server. The first client 110 may compare the generated hash sum of the public key to the digest received from the DNS server 130. If the generated hash sum matches the public key digest, then the public key is verified and the public key may be used to encrypt the email.

For example, an email address of user7@example.com yields a returned resource record that includes a TXT record of v=DPR url=https://pks.example.com/user7_pub.txt md5: 5d41402abc4b2a76b9719d911017c592. The first client 110 may request a public key based on this resource record from https://pks.example.com/user7_pub.txt hosted by the user key server 124. Public key "ThisIsAnExamplePublicKeyThatWouldNormallyBeRandomText" may be returned, in response to the request, to the first client 110 from the user key server 124. The first client 110 may generate a hash sum of 60778fadcd7728c1bce3b93700e8900a. Upon comparison, the first client 110 may compare the generated hash sum to the digest (previously obtained from the DNS server 130) and upon determining that the public key does not match the digest, inform the user of the first client of the discrepancy.

At 158, after the first client 110 encrypts the email with the public key received at 156, and verifies the public key if a digest was included in the resource records received at 152, the first client may send the encrypted email to the sender server 112. At 160, the sender server 112 may send the encrypted email received at 158 to the recipient server 122. At 170, the recipient server 122 may send the encrypted email received at 160 to the second client 120. The second client 120 may utilize a private key to decrypt the encrypted email received at 170.

Figure 2:
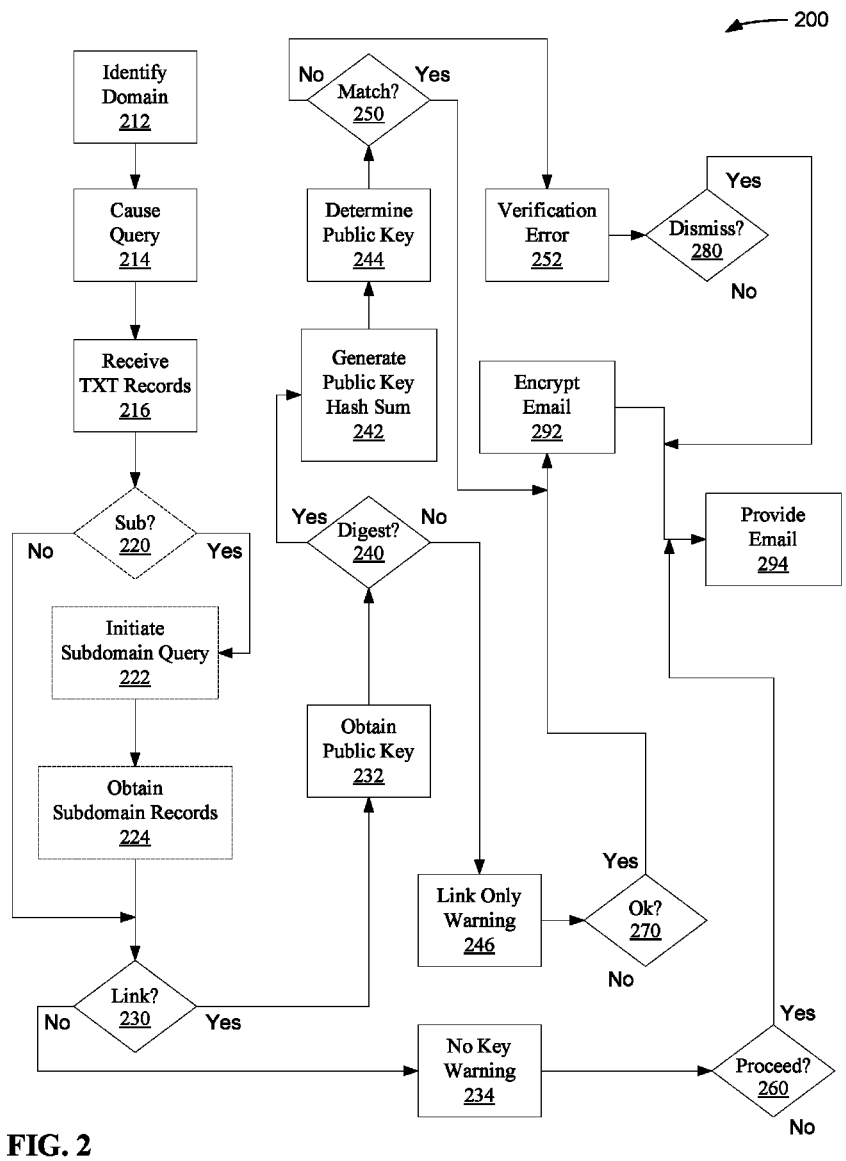
FIG. 2 depicts an example method for using a Domain Name System (DNS) record to enable secure communication consistent with embodiments of the present disclosure.

FIG. 2 depicts an example method 200 for using a Domain Name System (DNS) record to enable secure communication consistent with embodiments of the present disclosure. The operators of method 200 may be performed by components of a client (e.g., an MUA for email, a chat client of a chat program, etc.) that intends to send a communication to a communication address. The operations of method 200 may be performed as a routine or subroutine operation part of a communication system (e.g., a mail daemon operating as subroutine on a server, an outbound communication task running on a smartphone to encrypt and transmit secure text messages, etc.). For example purposes, method 200 may be explained in the context of an MUA trying to securely transmit an email to the email address employee1@example.com. The method 200 may begin at operation 212, wherein a domain of the email address may be identified. The domain may be a domain part of the email address, the local part of the email address, or both. For example, an email address of employee1@example.com may have a local part of employee1 and a domain part of example.com.

Per operation 214, the domain may utilized to cause a query of a domain name system (DNS). The DNS may be one or more hierarchically organized name servers that provide directory services to a network (e.g., translating IP addresses to resources accessible by the Internet). The query may propagate through one or more domain name servers of the DNS to retrieve one or more resource records. The resource records may be in a TXT record stored locally on a DNS server. The resource records may be in a TXT record cached on a first DNS server from a second DNS server. In response to the caused query and per operation 216, one or more TXT records associated with the domain may be received from the DNS. Given the employee1@example.com email address, causing a domain query (per operation 214) of example.com may return a received TXT record (per operation 216) including the following:

employee1 IN TXT "v=DPR url=https://key.example.com/employee1_pub.txt"

In some embodiments, the received TXT records may indicate that a subdomain is assigned for storing communication related resource records (e.g., example.com may store email resource records at EML.example.com). Per operation 222, if the TXT records are identified as referring to a subdomain at 220, a subdomain query may be initiated based on the TXT records received at 216. The subdomain query may propagate through one or more domain name servers of the DNS to retrieve one or more subdomain records. In response to the initiated subdomain query and per operation 224, one or more subdomain records may be obtained from the DNS. Given the employee1@example.com email address, a caused domain query (per operation 214) of example.com may return a received TXT record (per operation 216) including the following:

@ IN TXT "v=DPR domain=EML.example.com keyserver=https://k.example.com/"

Likewise, the initiated subdomain query (per operation 222) based on the above domain may return an obtained subdomain record (per operation 224) including the following:

employee1 IN TXT "v=DPR uri=employee1_public_key.txt"

Per operation 232, if the received TXT record or obtained subdomain record contain a link (e.g., reference) to a public key at 230, the public key may be obtained. Given the above example records, the MUA may obtain a public key for email address employee1@example.com from a host name https://k.example.com/employee1_public_key.txt. Per operation 234, if no link in the received TXT record or obtained subdomain record contains a public key reference at 230, the MUA may present a warning that indicates to a user that an email may not be encrypted (e.g., no key available). Per operation 294, if the user indicates he wishes to proceed at 260, an email may be provided. The email may be provided (per operation 294) to an external agent (e.g., a mail outbox, a MTA operating on a remote server, etc.). If the user indicates that they wish to proceed at 260, the email provided (per operation 294) may be unencrypted.

In a situation where the public key is obtained (per operation 232), the public key may be a string of generated characters (e.g., lowercase letters, capital letters, numbers, symbols, whitespace character, etc.). An example public key may include the following:

nvLmvJwuaopPGL0Fr2ae6Xi9jtztCshfEFJZ7VruhCu-PFekGOulEmyYPnC
jYlb3esKENTd8jhEEFzYfNYBbmGBqHNrSRh6hlw-kf951eBZ3rq6gDLaGtC
0qEi3Kr5DnK4mAWCgAyH7o7oJCy1XQyFgOIlt0J-22jM8UUvEyAFh219vwc
RWVRF1Xd94oG6hoiac3mLcAjasMDNrS1Jw27ge-OytJDuR7743WwfX1KIzG
UddJJsB0y72XUnH8FVSf0B7T8x1w4OA7RQADTE-nShFqY7mtvN6d1HymUt3
byYhhaFdXLvemX5raAATi4yQkBYqqZoNxNECA-GRumXtBgSTFek0yl522tA
2hKXdU461BcQcNt7tQ60QC6oSnjBjxJknDVQH3znq-kBDVisu3sTCURq9mk
MgMPcB1zJYCoCwYdey8xAhYY964P7Jh7vRZ2GA-PfSYwxnd6BNKQm1xsmtU
MNRoTFDMBhjtOrlRUYN2Ckp6R1IMRSUKobMR The public key reference received at 216 (or obtained at 224) may also contain a digest. The digest may be a first hash of the public key that was generated generally contemporaneously to publishing of the public key. The digest may be utilized to verify the authenticity of the public key. An example public key reference including a digest may be TXT record "v=DPR uri=employee1_public_key.txt md5=af7f17ff4c316f98fa54ed38b2a295be" for email address of employee1@example.com. Per operation 242, if the public key reference obtained at 216 (or 224) contains a digest at 240, a public key hash sum (e.g., a second hash of the public key generated by an MUA) may be generated by a hashing algorithm. Per operation 244, the public key may be identified (e.g., determined, verified, compared, etc.) from the digest and the generated public key hash sum.

If the public key reference obtained at 216 (or 224) does not contain a digest at 240, a link only warning (per operation 246) may be presented to the user. If the user indicates that a public key reference without a digest is okay at 270, an email may be encrypted with the unverified public key (per operation 292). Per operation 294, the email encrypted with the unverified public key may be provided to an MTA.

If the generated public key hash sum matches the digest at 250, the email may be encrypted with the verified public key (per operation 292). Per operation 294, the email encrypted with the verified public key may be provided to an MTA. If the generated public key hash sum does not match the digest at 250, a verification error may be presented to a user (per operation 252). The verification error may inform the user that the public key linked to in the DNS resource record reference does not match. In some embodiments, the user may explicitly dismiss the verification error (e.g., the user understands from the error that any communication is unsecure). If the user explicitly dismisses the verification error at 280, the MUA may provide the unencrypted email to the user (per operation 294).

Figure 3:
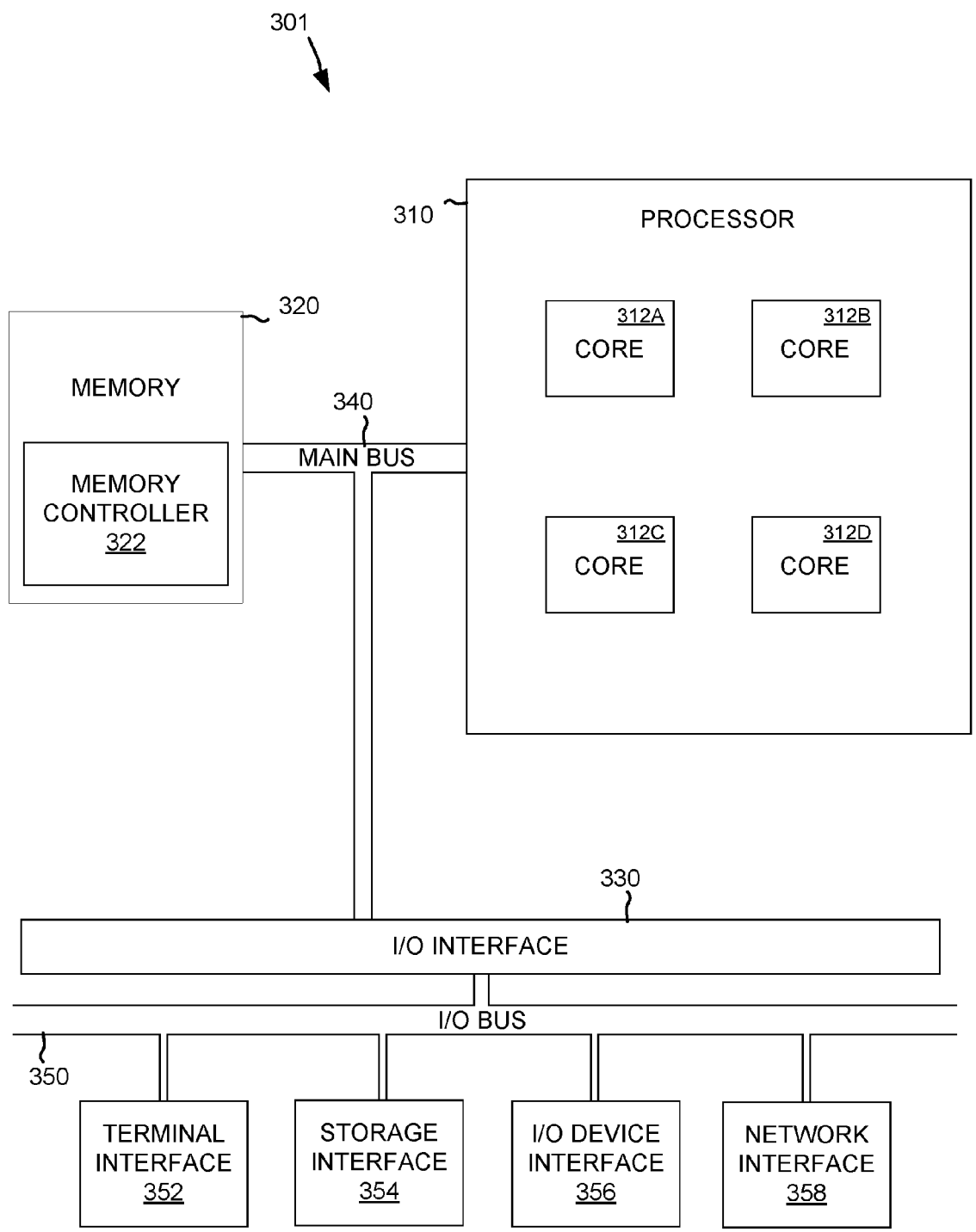
FIG. 3 depicts the representative major components of an example computer system that may be used, in accordance with embodiments of the present disclosure.

FIG. 3 depicts the representative major components of an example computer system 301 that may be used, in accordance with embodiments of the present disclosure. Any client devices, computers, smartphones, and servers, may be but are not limited to a computer similar to the computer system depicted in FIG. 3. It is appreciated that individual components may vary in complexity, number, type, and\or configuration. The particular examples disclosed are for example purposes only and are not necessarily the only such variations. The computer system 301 may comprise a processor 310, memory 320, an input/output interface (herein I/O or I/O interface) 330, and a main bus 340. The main bus 340 may provide communication pathways for the other components of the computer system 301. In some embodiments, the main bus 340 may connect to other components such as a specialized digital signal processor (not depicted).

The processor 310 of the computer system 301 may be comprised of one or more cores 312A, 312B, 312C, 312D (collectively 312). The processor 310 may additionally include one or more memory buffers or caches (not depicted) that provide temporary storage of instructions and data for the cores 312. The cores 312 may perform instructions on input provided from the caches or from the memory 320 and output the result to caches or the memory. The cores 312 may be comprised of one or more circuits configured to perform one or methods consistent with embodiments of the present disclosure. In some embodiments, the computer system 301 may contain multiple processors 310. In some embodiments, the computer system 301 may be a single processor 310 with a singular core 312.

The memory 320 of the computer system 301 may include a memory controller 322. In some embodiments, the memory 320 may comprise a random-access semiconductor memory, storage device, or storage medium (either volatile or non-volatile) for storing data and programs. In some embodiments, the memory may be in the form of modules (e.g., dual in-line memory modules). The memory controller 322 may communicate with the processor 310, facilitating storage and retrieval of information in the memory 320. The memory controller 322 may communicate with the I/O interface 330, facilitating storage and retrieval of input or output in the memory 320.

The I/O interface 330 may comprise an I/O bus 350, a terminal interface 352, a storage interface 354, an I/O device interface 356, and a network interface 358. The I/O interface 330 may connect the main bus 340 to the I/O bus 350. The I/O interface 330 may direct instructions and data from the processor 310 and memory 320 to the various interfaces of the I/O bus 350. The I/O interface 330 may also direct instructions and data from the various interfaces of the I/O bus 350 to the processor 310 and memory 320. The various interfaces may include the terminal interface 352, the storage interface 354, the I/O device interface 356, and the network interface 358. In some embodiments, the various interfaces may include a subset of the aforementioned interfaces (e.g., an embedded computer system in an industrial application may not include the terminal interface 352 and the storage interface 354).

Logic modules throughout the computer system 301—including but not limited to the memory 320, the processor 310, and the I/O interface 330—may communicate failures and changes to one or more components to a hypervisor or operating system (not depicted). The hypervisor or the operating system may allocate the various resources available in the computer system 301 and track the location of data in memory 320 and of processes assigned to various cores 312. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:

identifying, by an email client of a sender, a domain from a communication address of a recipient, the domain corresponds to a host name, wherein the client is operating on a computing device;

causing, by the client, resource records of a domain name system (DNS) associated with the host name to be queried for a public key reference stored in the resource records, the public key reference associated with the communication address;

receiving, by the client and in response to the causing the resource records to be queried, the public key reference directed to a subdomain corresponding to a second host name;

causing, by the client, secondary resource records associated with the second host name to be queried for a second public key reference stored in the secondary resource records;

obtaining, by the client and in response to the causing the secondary resource records to be queried for the second public key reference, the second public key reference, the second public key reference including a uniform resource indicator that corresponds to a location of a public key;

causing, by the client, the secondary resource records associated with the second host name to be queried for a third public key reference stored in the secondary resource records;

obtaining, by the client and in response to the causing the secondary resource records to be queried for the third public key reference, the third public key reference, the third public key reference including a digest for verification of the public key, wherein the digest is generated by the recipient from the public key before being provided to the DNS for storage in the third public key reference;

retrieving, by the client and based on the uniform resource indicator, the public key from the location, wherein the location is a key server;

generating, by the client and based on a hashing algorithm, a public key hash sum from the retrieved public key;

comparing, by the client, the digest to the retrieved public key hash sum;

determining, by the client and based on the comparison, the public key is non-matching;

presenting, by the client, a verification error based on the determined non-matching public key, the verification error informing a user that any communication with the communication address is unsecure, the verification error dismissible by the user; and providing, by the client and based on a dismissal of the verification error, an unencrypted email to the communication address.

* * * * *